US009083248B2

(12) United States Patent
Park et al.

(10) Patent No.: US 9,083,248 B2
(45) Date of Patent: Jul. 14, 2015

(54) PWM CONTROL CIRCUIT, FLYBACK CONVERTER AND METHOD FOR CONTROLLING PWM

(71) Applicant: SAMSUNG ELECTRO-MECHANICS CO., LTD., Gyeonggi-do (KR)

(72) Inventors: Deuk Hee Park, Gyeonggi-do (KR); Yun Joong Lee, Seoul (KR); Sang Hyun Cha, Seoul (KR); Jae Shin Lee, Korea (KR); Chang Seok Lee, Gyeonggi-do (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 373 days.

(21) Appl. No.: 13/734,725

(22) Filed: Jan. 4, 2013

(65) Prior Publication Data

US 2013/0169182 A1 Jul. 4, 2013

(30) Foreign Application Priority Data

Jan. 4, 2012 (KR) .................. 10-2012-0001124

(51) Int. Cl.
*H05B 41/14* (2006.01)
*H02M 3/335* (2006.01)
*H05B 37/02* (2006.01)
*H05B 33/08* (2006.01)

(52) U.S. Cl.
CPC ....... *H02M 3/33507* (2013.01); *H05B 33/0815* (2013.01); *H05B 37/02* (2013.01); *Y02B 20/346* (2013.01)

(58) Field of Classification Search
CPC .......... H02M 3/33507; H05B 33/0815; H05B 37/02; Y02B 20/346

USPC ............. 315/291, 307, 308; 363/21.1, 21.11, 363/21.15, 21.18
See application file for complete search history.

(56) References Cited

U.S. PATENT DOCUMENTS

| | | | | |
|---|---|---|---|---|
| 5,305,192 | A * | 4/1994 | Bonte et al. | 363/21.16 |
| 6,356,466 | B1 * | 3/2002 | Smidt et al. | 363/21.17 |
| 6,385,059 | B1 * | 5/2002 | Telefus et al. | 363/21.15 |
| 7,388,764 | B2 * | 6/2008 | Huynh et al. | 363/21.16 |
| 7,679,936 | B2 * | 3/2010 | Huynh et al. | 363/16 |
| 7,688,009 | B2 | 3/2010 | Bayadroun | |
| 8,379,413 | B2 * | 2/2013 | Ren et al. | 363/21.12 |
| 8,477,516 | B2 * | 7/2013 | Chien et al. | 363/21.16 |
| 8,552,651 | B2 * | 10/2013 | Sugino et al. | 315/111.41 |
| 8,717,785 | B2 * | 5/2014 | Gaknoki et al. | 363/21.13 |

FOREIGN PATENT DOCUMENTS

KR  1020110040700 A  4/2011

* cited by examiner

*Primary Examiner* — Kenneth Wells
(74) *Attorney, Agent, or Firm* — Bracewell & Giuliani LLP; Brad Y. Chin

(57) ABSTRACT

Disclosed herein are a PWM control circuit, a flyback converter, and a PWM control method. The PWM control circuit includes: a peak storing and reference signal generating unit storing a peak value of one period of a feedback signal from a secondary side output and inverting the peak signal and outputting the inverted peak signal as a reference signal; and a PWM control signal generating unit generating a PWM control signal by using an output obtained by comparing the reference signal with a reference waveform from the peak storing and reference signal generating unit. In addition, the flyback converter including the same and the method for controlling PWM are proposed.

20 Claims, 4 Drawing Sheets

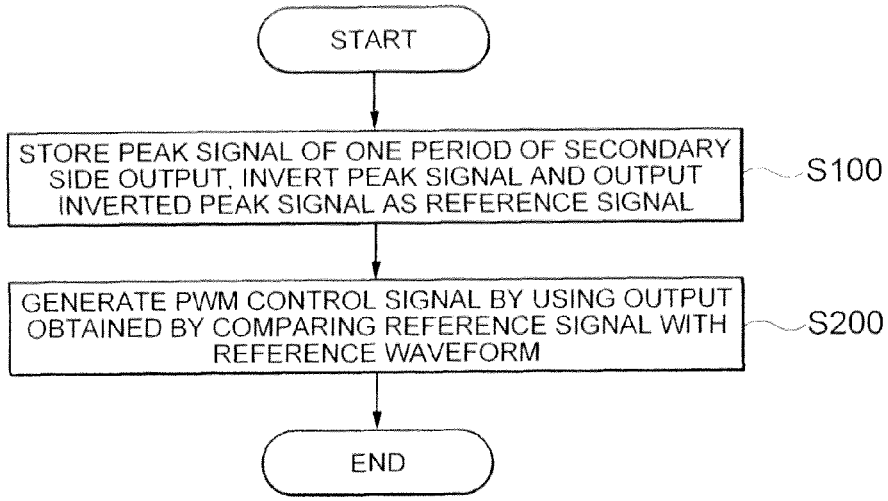
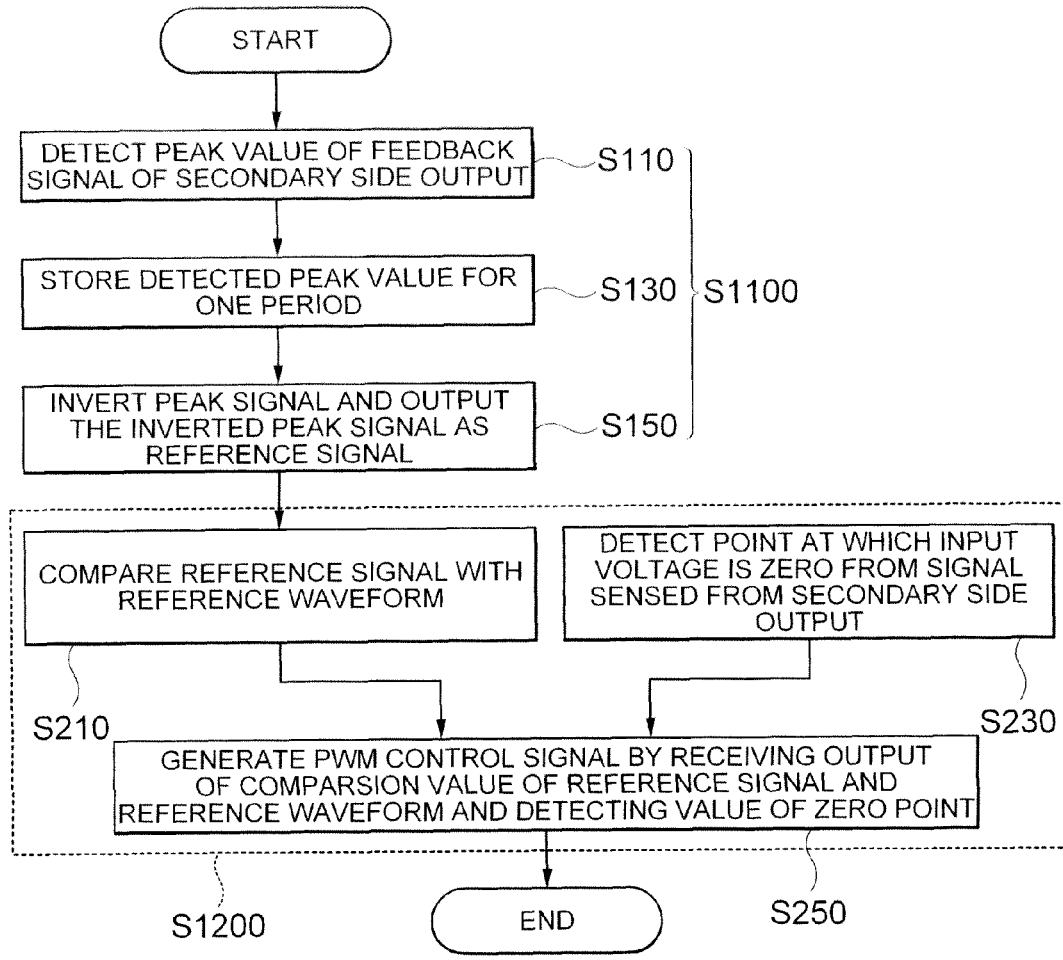

PWM CONTROL CIRCUIT, FLYBACK CONVERTER AND METHOD FOR CONTROLLING PWM

CROSS REFERENCE(S) TO RELATED APPLICATIONS

This application claims the benefit under 35 U.S.C. Section 119 of Korean Patent Application Serial No. 10-2012-0001124, entitled "PWM Control Circuit, Flyback Converter, and Method for Controlling a PWM" filed on Jan. 4, 2012, which is hereby incorporated by reference in its entirety into this application.

BACKGROUND OF THE INVENTION

1. Technical Field

The present invention relates to a PWM control circuit, a flyback converter, and a method for controlling a PWM. More specifically, the present invention relates to a PWM control circuit storing a peak value of one period of a feedback signal from a secondary side output and then, using the stored peak value for a PWM control of a next period, a flyback converter, and a PWM control method.

2. Description of the Related Art

A lighting apparatus using an LED has an advantage of longer lifespan, lower power consumption, or the like, as compared with the existing lighting apparatuses. In order to implement the lighting apparatus using the LED, various structures have been researched and developed.

A circuit for driving the existing LED usually takes a structure of supplying constant voltage or current to the LED constant. For example, in order to isolate a primary side from a secondary aide, a flyback structure, a forward structure, and the like, using a transformer have been used. Further, a buck structure, a buck-boost structure, and so on, which do not isolate the primary side from the secondary side have been used.

In order to implement a constant voltage structure or a constant current structure, there is a need to sense current or voltage of the secondary side and then, reflect the sensed current or voltage to a signal compares with reference voltage through an error amplifier and an output from the error amplifier again compares with a ramp signal, thereby generating the PWM control signal.

The structure may remarkably reduce line regulation characteristics when a period of input voltage is constant but a magnitude thereof is changed.

SUMMARY OF THE INVENTION

An object of the present invention is to provide a PWM control technology of storing a peak value of one period of a feedback signal from a secondary side output and using the stored peak value for a PWM control of a next period.

According to an exemplary embodiment of the present invention, there is provided a PWM control circuit, including: a peak storing and reference signal generating unit storing a peak value of one period of a feedback signal from a secondary side output and inverting the peak signal and outputting the inverted peak signal as a reference signal; and a PWM control signal generating unit generating a PWM control signal by using an output obtained by comparing the reference signal with a reference waveform.

The peak storing and reference signal generating unit may include: a peak detector detecting a peak value of one period of the feedback signal from the secondary side output; a sample and hold circuit storing a peak signal defected by the peak detector for one period and outputting; and an inverter inverting the peak signal output from the sample and hold circuit and outputting the inverted peak signal as the reference signal.

The PWM control signal generating unit may include: a PWM comparator comparing the reference signal output from the peak storing and reference signal generating unit with the reference waveform and outputting; a zero point detector detecting a point at which an input voltage is zero by using a signal sensed from the secondary side output; and a sequential circuit receiving an output of the PWM comparator and the zero point detector as an input and outputting the PWM control signal.

The zero point detector may detect a point at which the input voltage is zero by comparing the signal sensed from the secondary side output with a predetermined low reference voltage signal.

The secondary side output provided to the zero point detector may be an output from an auxiliary winding of the secondary side.

The peak storing and reference signal generating unit may receive the feedback signal of the secondary side output from a photocoupler.

The PWM control circuit may be an LED driving circuit.

According to another exemplary embodiment of the present invention, there is provided a flyback converter, including: a transformer transforming and providing input voltage of a primary side into input voltage of a secondary side; the PWM control circuit according to any one of the above-mentioned first exemplary embodiment; and a power transistor driven by the PWM control circuit and turning-on/off the input voltage of the primary side of the transformer.

The flyback converter may be used for an LED lighting driving circuit.

According to another exemplary embodiment of the present invention, there is provided a method for controlling PWM, including: storing a peak signal of one period of a feedback signal of a secondary side output, inverting the peak signal and outputting the inverted peak signal as a reference signal; and generating a PWM control signal by using an output obtained by comparing the reference signal with the reference waveform.

The storing, inverting and output ting may include: detecting a peak value of one period of the feedback signal from the secondary side output; storing the detected peak signal for one period; and inverting the peak signal and outputting the inverted peak signal as the reference signal.

The generating of the PWM control signal may include: comparing the reference signal with the reference waveform; detecting a point at which an input voltage is zero by using a signal sensed from the secondary side output; and generating and outputting a PWM control signal by receiving the output from the comparing of the reference waveform and the detecting of the zero point as an input.

At the detecting of the zero point, the point at which the input voltage is zero by comparing the signal sensed from an output of the secondary side with a predetermined low reference voltage signal may be sensed.

The secondary side output provided at the detecting of the zero point may be an output from an auxiliary winding of the secondary side.

At the outputting of the reference signal, a peak signal of one period may be stored by receiving the feedback signal of the secondary-side output from a photocoupler.

The PWM control method may be a method for controlling an LED driving circuit.

BRIEF DESCRIPTION OF THE DRAWINGS

FIG. 6 is a flow chart schematically showing a PWM control method according to a third exemplary embodiment of the present invention; and FIG. 7 is a flow chart schematically showing a PWM control method according to a third exemplary embodiment of the present invention.

DESCRIPTION OF THE PREFERRED EMBODIMENTS

Figure 1:
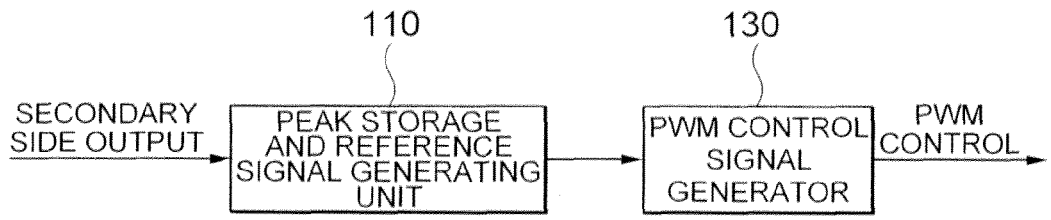
FIG. 1 is a block diagram schematically showing a PWM control circuit according to a first exemplary embodiment of the present invention.

Exemplary embodiments of the present invention for accomplishing the above-mentioned objects will be described with reference to the accompanying drawings. In describing exemplary embodiments of the present invention, the same reference numerals will be used to describe the same components and an additional description that is overlapped or allow the moaning of the present invention to be restrictively interpreted will be omitted.

In the specification, it will be understood that unless a term such as 'directly' is not used in a connection, coupling, or disposition relationship between one component and another component, one component may be 'directly connected to', 'directly coupled to' or 'directly disposed to' another element or be connected to, coupled to, or disposed to another element, having the other element intervening therebetween. In addition, this may also be applied to terms including the meaning of contact such as 'on', 'above', 'below', 'under', or the like. In the case in which a standard element is upset or is changed in a direction, terms related to a direction may be interpreted to including a relative direction concept.

Although a singular form is used in the present description, it may include a plural form as long as it is opposite to the concept of the present invention and is not contradictory in view of interpretation or is used as clearly different meaning. It should be understood that "include", "have", "comprise", "be configured to include", and the like, used in the present description do not exclude presence or addition of one or more other characteristic, component, or a combination thereof.

First, the PWM control circuit according to the first exemplary embodiment of the present invention will be described in detail with reference to the accompanying drawings.

Figure 2:
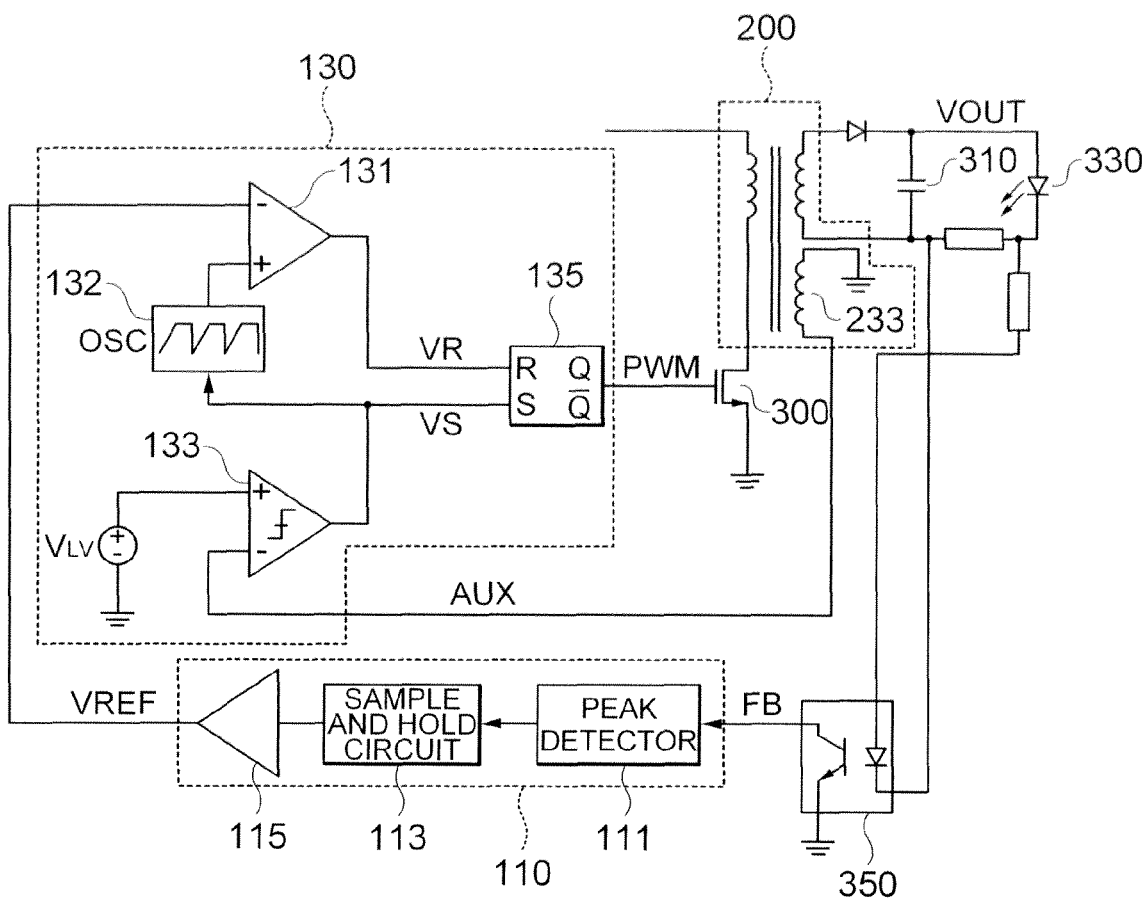
FIG. 2 is a circuit diagram schematically showing a circuit including a PWM control circuit according to a first exemplary embodiment of the present invention.
Figure 4:
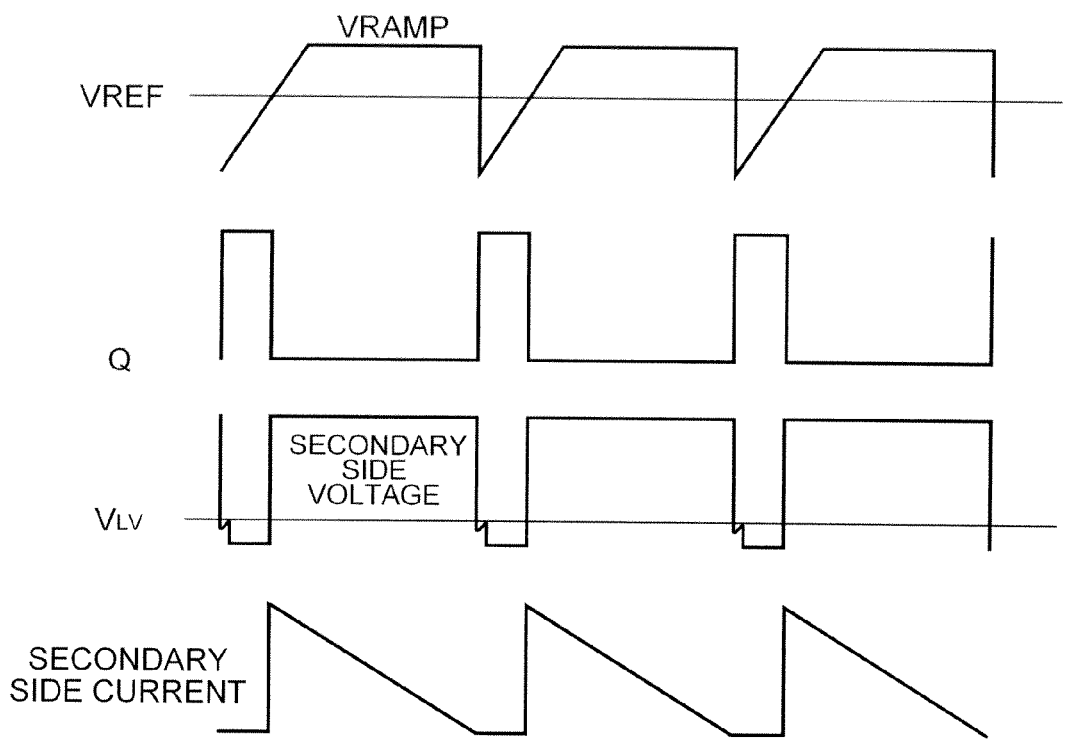
FIG. 4 is a timing graph of signals of the PWM control circuit according to the first exemplary embodiment of the present invention.
Figure 5A:
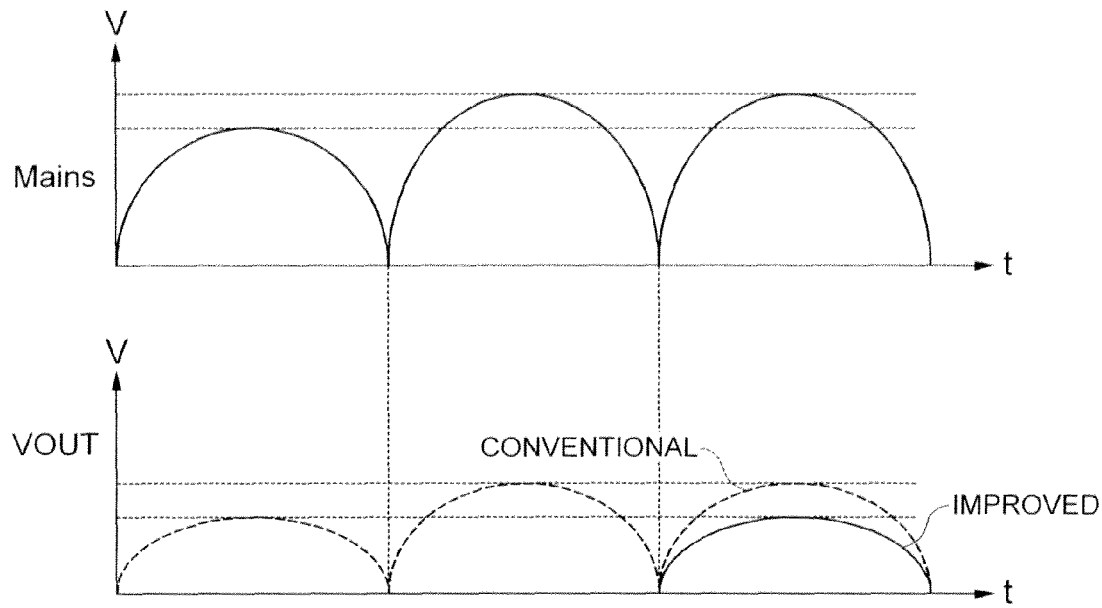
FIGS. 5A and 5B are graphs schematically showing regulation characteristics of the PWM control circuit according to the first exemplary embodiment of the present invention.
Figure 5B:
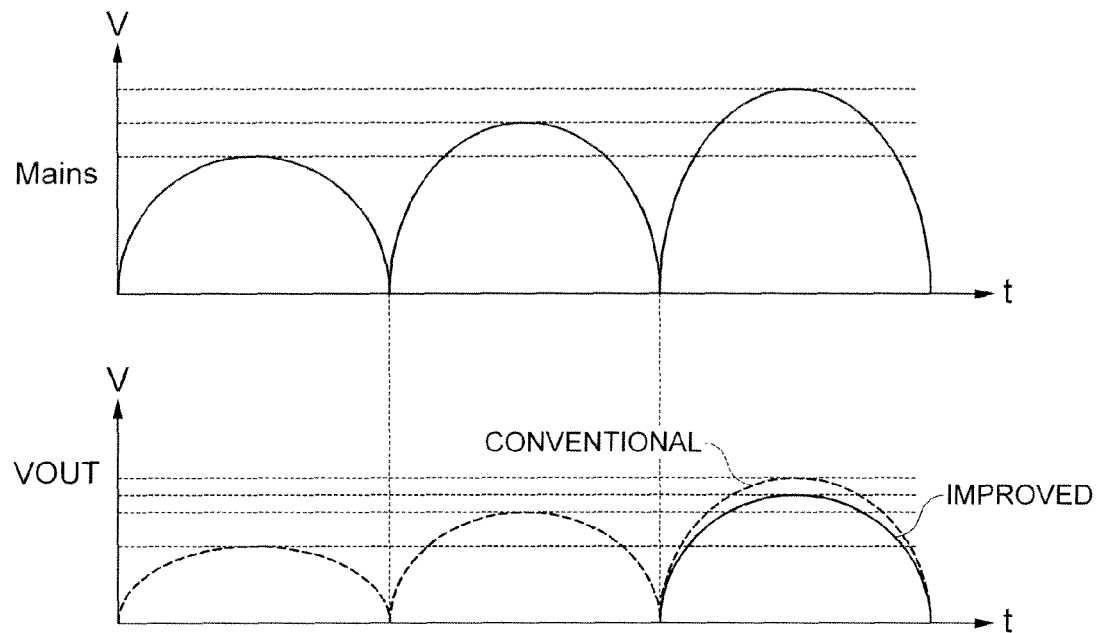

FIG. 1 is a block diagram schematically showing a PWM control circuit according to an exemplary embodiment of the present invention and FIG. 2 is a circuit diagram schematically showing a circuit including a PWM control circuit according to a first exemplary embodiment of the present invention, FIG. 4 is a timing graph of signals of the PWM control circuit according to the first exemplary embodiment of the present invention. FIGS. 5A and 5B are graphs schematically showing regulation characteristics of the PWM control circuit according to the first exemplary embodiment of the present invention.

Referring to FIGS. 1 and 2, the PWM control circuit according to the first exemplary embodiment of the present invention may include a peak storing and reference signal generating unit 110 and a PWM control signal generating unit 130.

In an exemplary embodiment of the present invention, the PWM control circuit (see 100 of FIG. 3) may be an LED driving circuit.

Referring to FIGS. 1 and/or 2, the peak storing and reference signal generating unit 110 stores a peak value of one period of a feedback signal from a secondary side output and inverts the peak signal and outputs the inverted peak signal as a reference signal.

The peak storing and reference signal generating unit 110 stores a peak value of one period of a secondary side output and transfers the stored peak value to the PWM control signal generating unit 130. In this case, the peak value of one period stored in the peak storing and reference signal generating unit 110 is used at the time of generating the PWM control signal of the next period of the input signal. That is, a peak value of a previous period stored in the peak storing and reference signal generating unit 110 is inverted and output as the reference signal, wherein the reference signal compares with a reference waveform by a PWM comparator 131 and is output as a signal of which a pulse width is modulated. As a result, the line regulation characteristics may be improved. For example, describing this with reference to FIGS. 5A and 5B, when an input voltage of the primary side is larger in a second period than in a first period, output voltage is also increased. Here, when a third period starts, the peak, value of the second period stored in the peak storing and reference signal generating unit 110 is inverted and output as a reference signal and therefore, a signal value lower than that of the second period is output as a reference signal. The low reference signal compares with a reference waveform by the PWM comparator 131 and therefore, a low output time is shorter than that of the second period and an on time of a power transistor switch 300 is short. Therefore, an output, of the third period is relatively stable without being proportional to the increase in input voltage of the primary side and as a result, the line regulation characteristics can be more improved than the structure according to the related art.

Describing this in more detail with reference to FIG. 2, the peak storing and reference signal generating unit 1.10 according to an example may include a peak detector 111, a sample and hold circuit 113, and an inverter 115. The inverter 115 reversely inputs a small reference signal to the PWM comparator 131 when the period peak stored in the sample and hold circuit 113 is larger than that of the previous period, thereby reducing the on time of the power transistor switch 300 and relatively stabilizing the secondary side output. Therefore, a configuration of the inverter 115 according to the exemplary embodiment of the present invention is replaced with, for example, an error amplifier (net shown), thereby outputting the reference signal, opposite to a change in the peak value stored in the sample and hold circuit 113. The peak, storing and reference signal generating unit 110 stores the peak of the feedback signal, by using the peak detector 111 and the sample and hold circuit 113. Further, the peak storing and reference signal generating unit 110 inverts a peak value of a just previous period stored in the sample and hold circuit 113 through the inverter 115 or the error amplifier (not shown) or reverses a change in a peak value of the just previous period, compared with two periods before so as to be output as the reference signal. In FIG. 2, the peak signal stored in the sample and hold circuit 113 is used at the time of generating the PWM control signal of the next period.

In FIG. 2, the peak detector 111 detects the peak value of one period of the feedback signal from the secondary side output. A method for detecting a peak value of one period is known in advance and therefore, the detailed description thereof will be omitted.

The sample and hold circuit 113 of FIG. 2 stores and outputs the peak signal detected by the peak detector 111 for one period. The sample and hold circuit 113 is a circuit that stores any signal and holds the stored signal until it receives a signal to be stored subsequently. In the exemplary embodiment of the present invention, the sample and hold circuit 113 stores the peak value of one period detected by the peak detector 111.

In addition, the inverter 115 of FIG. 2 inverts the peak value stored in the sample and hold circuit 113 and outputs the inverted signal as the reference signal. That is, when the peak value stored in the sample and hold circuit 113 is larger than the peak value stored for the previous period, the sample and hold circuit 113 may output the relatively smaller reference signal than that in the previous period through the inversion and when the peak value stored in the sample and hold circuit 113 is smaller than the peak value stored for the previous period, the sample and hold circuit 113 may output the relatively larger reference signal than that in the previous period through the inversion. The period peak value changed as described above is inverted or is reversely changed so as to be output as the reference signal and therefore, the on time of the power transistor switch 300 is changed to relatively stabilize the secondary side output. Therefore, a configuration of the inverter 115 is replaced with, for example, an error amplifier (not shown), thereby outputting the reference signal opposite to a change in the peak value stored in the sample and hold circuit 113.

According to the exemplary embodiment of the present invention, the peak storing and reference signal generating unit 110 receives the feedback signal from the secondary side output from a photocoupler 350. The feedback signal from the photocoupler 350 transferring the feedback signal from the output signal of the secondary side is changed according to the primary side input voltage. In this case, the peak storing and reference signal generating unit 110 detects and stores the peak value of one period and uses the stored peak value at the time of generating the PWM control signal of the next period.

Next, referring to FIGS. 1 and/or 2, the PWM control signal generating unit 130 uses the output obtained by comparing the reference signal with the reference waveform from the peak storing and reference signal generating unit 110 to generate the PWM control signal. The output reference signal compares with the reference waveform so that the peak signal feedback from the secondary side output is inverted or the change in the peak signal is shown reversely. The PWM control is performed by changing a length of a pulse period of the PWM control signal by comparing the reference signal with the reference waveform. In this case, the reference waveform may be a triangular wave, a ramp wave, and a sawtooth wave, or the like. In the exemplary embodiment of the present invention, the line regulation characteristics can be improved by comparing the reference signal obtained by inverting the peak value of one period stored in the peak storing and reference signal generating unit 110 so as to prevent the line regulation from being hindered due to a ripple included in the existing feedback signal with the reference waveform or comparing the reference signal reversely increased and decreased when comparing with the previous period with the reference waveform.

Describing this in more detail with reference to FIG. 2, in one exemplary embodiment of the present invention, the PWM control signal generating unit 130 may include a PWM comparator 131, a zero point detector 133, and a sequential circuit 135, for example, a flip flop circuit or a latch circuit.

The PWM comparator 131 of FIG. 2 compares the reference signal obtained from the peak storing and reference signal generating unit 110 with the reference waveform and outputs the result. The reference signal input to the PWM comparator 131, which is a signal generated by inverting the peak value of one period of the feedback signal from the secondary side output by the peak storing and reference signal generating unit 110 or the signal generated by reversely increasing or decreasing the signal at the time of comparing with the previous period, is input as reference voltage VREF for determining a duty ratio of the PWM signal by comparing with the reference waveform by the PWM comparator 131. That is, the PWM inverter 131 inputs the just previous period peak signal stored from the peak storing and reference signal generating unit 110 and the inverted or reversely increased and decreased reference signal VREF and compares the peak signal with the reference waveform using the reference waveform by an output of, for example, an oscillator as another input to generate a signal VP for determining the duty ratio of the PWM signal. In this case, the reference signal VREF may be input to an inverting terminal and the reference waveform may be input to a non-inverting terminal. If the VREF input to the PWM comparator 131 is fixed, there is no function of sensing the secondary side output, thereby degrading the load regulation characteristics. However, in the exemplary embodiment of the present invention, so as to supplement this, the peak value of one period of the feedback signal from the secondary side output is stored through the sample and hold circuit 113 and the VR signal is generated by using the reference signal VREF by inverting the stored peak value or the reversely increased and decreased reference signal VREF to the increase and decrease in the peak value. Therefore, the load regulation characteristics can be improved.

The reference waveform input to the PWM comparator 131 may be any one of, for example, a sawtooth wave, a triangular wave, and a ramp wave. Other waveforms can be used.

In FIG. 2, the zero point detector 133 detects a point at which an input voltage is zero by using a signal sensed from the secondary side output. The signal sensed from the secondary side output may be a signal from the secondary side auxiliary output. For example, the signal sensed from the secondary side output may be an output from an auxiliary winding 233 of a secondary side.

In this case, in the exemplary embodiment of the present invention, the zero point detector 133 may be configured to include a comparator that compares the signal sensed from the secondary side output with a predetermined low reference voltage signal $V_{LV}$ to sense a point at which the input voltage to the comparator is zero. In this case, referring to FIG. 2, the signal sensed from the secondary side output is input to an inverting terminal and the predetermined low reference voltage signal $V_{LV}$ is input to a non-inverting terminal to sense that the input voltage is zero. For example, the comparator sensing the zero point may generate a high signal when a signal sensed from the secondary side, that is, an auxiliary winding voltage signal is smaller than the predetermined low reference voltage signal $V_{LV}$ and may generate a low signal when the auxiliary winding voltage signal is larger than the predetermined low reference voltage signal $V_{LV}$.

The zero point detector 133 detects that the input voltage is "0", thereby outputting the signal VS. For example, the zero point detector 133 may be implemented by sensing (AUX) the output voltage to the auxiliary winding 233 of the secondary side, or the like, to compare with the predetermined low reference voltage signal $V_{LV}$, for example, approximately 0.1V voltage. The zero point detector 133 outputs the high signal when the sensing signal AUX from the auxiliary winding 233 of the secondary side is smaller than the predetermined low reference voltage signal $V_{LV}$ and outputs the low signal when the sensing signal AUX from the auxiliary winding 233 of the secondary side is larger than the predetermined low reference voltage signal $V_{LV}$.

In the exemplary embodiment of the present invention, the secondary side output supplied to the zero point detector 133 is an output from the auxiliary winding 233 of the secondary side.

Continuously, in FIG. 2, the sequential circuit 135 receives the output of the PWM comparator 131 and the zero point detector 133 as an input to output the PWM control signal. For example, the flip flop circuit or the latch circuit may be used as the sequential circuit 135. In this case, the sequential circuit 135 receives the output of the PWM comparator 131 and the output of the zero point detector 133 as a set S and a reset R to output the PWM control signal. For example, the flip flop circuit 135 is provided as the sequential circuit 135 and receives the reset signal VR from the PWM comparator 131 and receives a set signal VS from the zero point detector 133. In this case, when the VS is high and the VR is low by the RS flip flop circuit 135, the high signal is output at an Q output to generate the high signal as the PWM control signal. In this case, the PWM control signal makes on time constant and changes off time, such that the signal from the output end may be formed similarly to an input signal.

Alternatively, describing this with reference to FIG. 4, current at the primary side is increased for the on time of the power transistor switch 300 of FIG. 2 and energy is stored in a transformer 200. While the power transistor switch 300 is off, the energy temporarily stored in the transformer 200 is transferred to the secondary side. An amount of current transferred to the secondary side from transformer is reduced from an instant that the power transistor switch 300 is turned off. Therefore, when the amount of secondary current is smaller than diode driving current of the secondary side, the diode is turned-off and thus, the secondary side voltage is low. Therefore, the voltage of the auxiliary winding 233 of the secondary side is also low. In this case, comparing the feedback signal from the auxiliary winding 233 of the secondary side with the low reference voltage signal $V_{LV}$, the zero point of the secondary side output may be detected. When the feedback signal from the auxiliary winding 233 of the secondary side lower than the low reference voltage signal $V_{LV}$ is input to the zero point detector 133, the output of the zero point detector 133, that is, VS is high, such that Q is changed to high and an oscillator OSC is reset. In this case, the power transistor switch 300 of FIG. 2 becomes a turn-on state. In FIG. 4, the ramp signal is increased from a point in time when the oscillator is reset. In FIG. 2, when the signal VS is applied to the sequential circuit 135, the oscillator is reset to "0". From the point in time, the ramp signal is increased and a new period starts. In FIG. 4, when the ramp signal of the oscillator is larger than the VREF, the output of the PWM comparator 131 is high, such that Q is low and the ramp signal of the oscillator is no further increased and fixed. In this case, the power transistor switch 300 is turned-off.

In one exemplary embodiment of the present invention, the PWM signal is generated by using the peak signal fed back from the secondary side output, thereby improving the load regulation performance. Therefore, there is no need to use a large-capacity smoothing capacitor 310, thereby increasing the price competitiveness and expanding the lifespan.

In the exemplary embodiment of the present invention, in order to generate the PWM signal regardless of the ripple of the secondary side output signal, an output end does not need a large-capacity capacitor for smoothing by using the peak value of the previous period of the secondary side output. Therefore, the smoothing capacitor 310, for example, an electrolytic condenser used as a smoothing capacitor is removed or the capacity thereof is reduced, thereby expanding the lifespan of the LED lighting device 330 and improving the price competitiveness.

In the exemplary embodiment of the present invention, after the peak value of the feedback signal from the second side output is stored, the peak value is used at the time of generating the PWM control signal of the next period. Therefore, the line regulation characteristics can be more improved than the structure of controlling the PWM control signal by comparing the feedback signal from the photocoupler with the reference signal of the related art.

According to the exemplary embodiment of the present invention, the PWM control circuit is operated as pseudo-constant on time modulation improving load regulation characteristics.

Next, the regulation characteristics according to the exemplary embodiment of the present invention will be described with reference to FIGS. 5A and 5B.

In the system to which the PWM control circuit is applied, the period of the primary side input voltage may be constant, but the magnitude thereof may be changed. Referring to FIG. 5A, when the primary side input voltage, that is, a magnitude in voltage of Mains is more increased in a second cycle than in a first cycle and the primary side input voltage, that is, a magnitude in voltage of Mains is equal to each other in the second and third cycles, the output voltage of the second cycle is increased at the output voltage but the peak value of the previous period is used as the reference voltage for generating the PWM signal in the third cycle, thereby again reducing the output voltage. That is, referring to FIG. 2, the peak value of the previous period stored in the sample and hold circuit 113 is inverted through the inverter 115 or the error from the peak value of two periods before is inverted and amplified via the error amplifier (not shown) so as to be output as the low reference signal VREF and the low signal is shortly output by comparing with the reference waveform of the oscillator, such that the on time of the power transistor 300 is short and the output voltage transferred to the secondary side is reduced. Referring to FIG. 5A, when the magnitude in the primary side input voltage is increased for the current period, it is used as the reference voltage of the current period by using the peak value of the previous period and therefore, is not reflected to the PWM, but for the next period, the reference voltage is obtained by inverting the peak value of the current period or by inverting and amplifying the error between the current period and the previous period and thereby the on time and the output voltage is reduced.

In addition, referring to FIG. 5B, even when the magnitude in the primary side input signal Mains is continuously increased, it can be appreciated that a rising rate of output voltage from the third cycle is remarkably smaller than the structure of using the feedback signal as the reference signal as it is without using the peak storing and reference signal generating unit 110 from the photocoupler 350 according to the related art.

Next, the flyback converter according to the exemplary embodiment of the present invention will be described in more detail with reference to the drawings. The exemplary embodiment of the present invention will be described with reference to the PWM control circuit according to the above-mentioned first exemplary embodiment of the present invention and FIGS. 1, 2, 4, 5A, and 5B and the overlapping description thereof will be omitted.

Figure 3:
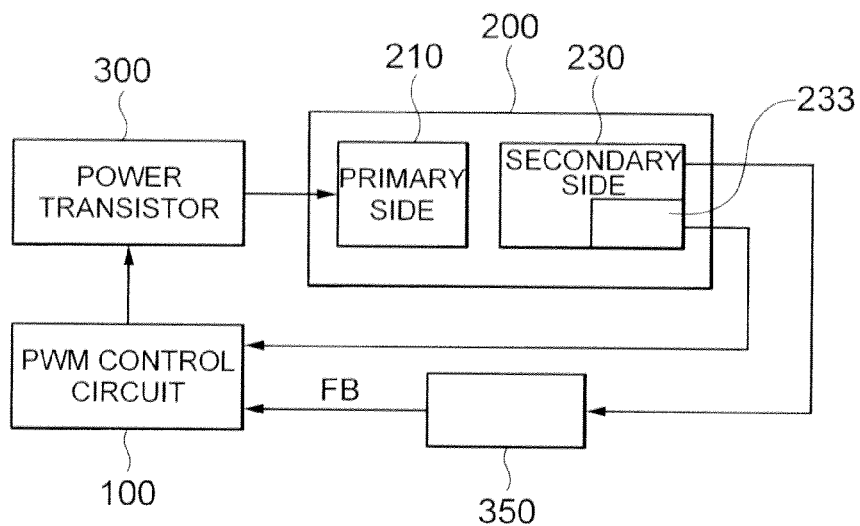
FIG. 3 is a block diagram schematically showing a flyback converter-according to a second exemplary embodiment of the present invention.

FIG. 3 is a block diagram schematically showing a flyback converter according to the second exemplary embodiment of the present invention. FIG. 2 schematically shows the flyback converter including the PWM control circuit.

Referring to FIGS. 2 and 3, the flyback converter according to the second exemplary embodiment of the present invention may be configured to include the transformer 200, the PWM control circuit 100, and the power transistor 300.

In an exemplary embodiment of the present invention, the flyback converter may be used for an RED lighting driving circuit.

In FIGS. 2 and/or 3, the transformer 200 transforms the primary side input voltage into the secondary side input voltage. The secondary side of the transformer 200 may include the auxiliary winding 233 in addition to the main winding 231. In this case, the output from the auxiliary winding 233 is sensed and inputted to the zero point detector 133 of the PWM control circuit, thereby the zero point detector 133 can detect a point at which voltage becomes "0".

Referring to FIG. 2, the secondary side main winding 231 of the transformer 200 is connected with a secondary output part to smooth a secondary output passing through a diode by the smoothing capacitor 310, such that smoothed DC power may be supplied to an LED 330. Further, the secondary output part is connected with the photocoupler 350 receiving the secondary output signal and providing the feedback signal and provides the feedback signal from the photocoupler 350 to the PWM control circuit 100. In this case, in the PWM control circuit 100, the peak storing and reference signal generating unit 110 detects and stores a peak value of one period and provides the reference signal obtained by inverting the stored peak value of next period or inverting and amplifying the error from the previous peak to the PWM control signal generating unit 130 so as to perform the PWM control.

The PWM control circuit 100 will be described with reference to FIG. 3. The PWM control circuit 100 of FIG. 3 is the PWM control circuit 100 according to the above-mentioned first exemplary embodiment of the present invention. Therefore, the above-mentioned first exemplary embodiment of the present invention will be described with reference to FIGS. 1 and 2. For example, the PWM control circuit 100 receives the feedback signal from the photocoupler 350 to detect and store the peak value of one period and then, uses the reference signal obtained by inverting a stored peak value of the next period or inverting and amplifying an error from a previous peak so as to perform the PWM control.

Referring to FIGS. 2 and/or 3, the power transistor 300 is driven by the PWM control circuit to turn-on/off the primary side input of the transformers 200.

Next, a method for controlling the PWM according to a third exemplary embodiment of the present invention will be described in more detail with reference to the drawings. The exemplary embodiment of the present invention will be described with reference to the PWM control circuit according to the above-mentioned first exemplary embodiment of the present invention and FIGS. 1, 2, 4, 5A, and 5B and the overlapping description thereof will be omitted.

FIGS. 6 and 7 are flow charts schematically showing a method for controlling PWM according to a third exemplary embodiment of the present invention.

Referring to FIG. 6, a method for controlling PWM according to the third exemplary embodiment of the present invention may include outputting a reference signal (S100) and generating a PWM control signal (S200).

In the exemplary embodiment of the present invention, the method for controlling PWM may be a method for controlling an LED driving circuit.

At the outputting of the reference signal of FIG. 6 (S100), the peak signal of one period of the feedback signal from the secondary side output is stored and the reference signal may be output by inverting the peak signal or inverting and amplifying the error from the previous peak signal.

At the outputting of the reference signal (S100), the peak value of one period of the secondary side output is stored and the reference signal is output by inverting and amplifying the stored peak value or the error from the previous peak and is transferred to generating the PWM control signal (S200). In this case, at the outputting of the reference signal (S100), the reference signal is output by inverting the stored peak value of one period or inverting and amplifying the error from the previous peak, which is used at the time of generating the PWM control signal.

Describing this in more detail with reference to FIG. 7, in one exemplary embodiment of the present invention, the outputting of the reference signal (S1100) includes detecting the peak value (S110), storing the peak value (S130), and outputting the reference signal by inverting the peak signal (S150). In this case, at the outputting of the reference signal by inverting the peak signal (S150), the reference signal may be output by inverting and amplifying the error between the stored peak signal in the previous step (S130) and the stored peak signal in the previous period by using the error amplifier (not shown).

At the outputting of the reference signal (S100), the peak of the feedback signal is stored by using the peak detector 111 and the sample and hold circuit 113 of FIG. 2. The peak value is used at the time of generating the PWM control signal of the next period of the input signal.

In FIG. 7, at the detecting of the peak value (S110), the peak value of one period of the feedback signal from the secondary side output is detected. At the detecting of the peak value (S110), the peak value of one period of the feedback signal from the secondary side output, for example, the feedback signal from the photocoupler 350 is detected by the peak detector 111 of FIG. 2.

At the storing of the peak value of FIG. 7 (S130), the detected peak signal is stored for one period. At the storing of the peak value FIG. 2 is stored for one period.

Further, in FIG. 7, at the outputting of the reference signal by inverting the peak signal (S150), the reference signal is output by inverting the peak signal stored at the previous step (S130) and therefore, the change in the peak may be relatively inverted so as to be output as the reference signal due to the increase and decreased in the output by comparing with the previous period. Further, at the outputting of the reference signal by inverting the peak signal (S150), the reference signal may be output by inverting and amplifying the error between the stored peak signal in the previous step (S130) and the stored peak signal in the previous period by using the error amplifier (not shown).

According to the exemplary embodiment of the present invention, at the outputting of the reference signal (S100 and S1100), the peak signal of one period is stored by receiving the feedback signal of the secondary side output from the photocoupler 350.

In FIG. 6, at the generating of the PWM control signal (S200), the PWM control signal is generated by using an output obtained by comparing the reference signal and the reference waveform.

Describing this in more detail with reference to FIG. 7, in one exemplary embodiment of the present invention, the generating of the PWM control signal (S1200) may include comparing the reference waveform (S210), detecting the zero point (S230), and generating and outputting the PWM control signal (S250).

At the comparing of the reference waveform of FIG. 7 (S210), the PWM control signal is output by comparing the reference signal with the reference waveform. At the comparing of the reference waveform (S210), the reference signal obtained by being inverted from the peak signal at the previous step (S150) or Inverting and amplifying the error from the previous peak signal is input as the reference voltage VREF for determining the duty ratio of the PWM signal by comparing with the reference waveform in the PWM comparator 131 of FIG. 2. That is, at the comparing of the reference waveform (S210), the reference signal is received as the reference signal VREF from the outputting of the reference signal (S100 and S1100) and the signal VR for determining the duty ratio of the PWM signal is generated by comparing the peak signal with the reference waveform using the reference waveform as another input by the output from a pulse generator, for example, an oscillator.

In FIG. 7, at the detecting of the zero point (S230), the point at which the voltage sensed and input from the secondary side output is sensed. In this case, the signal sensed from the secondary side output may be a signal from the secondary side auxiliary output.

In the exemplary embodiment of the present invention, at the detecting of the zero point (S230), the point at which the voltage input to the comparator is zero by comparing the signal sensed from the secondary side output with the predetermined low reference voltage signal. For example, the detecting of the zero point (S230) may be performed in the comparator of FIG. 2 sensing the point at which the input voltage is zero by comparing the signal sensed from the secondary side output with the predetermined low reference voltage signal.

Further, in the exemplary embodiment of the present invention, the provided secondary side output is an output from the auxiliary winding 233 of the secondary side provided at the detecting of the zero point (S230).

At the generating and outputting of the PWM control, signal of FIG. 7 (S250), it is possible to generate and output the PWM control signal by receiving the output from the comparing of the reference waveform (S210) and the detecting of the zero point (S230). For example, the generating and outputting of the PWM control signal may be performed by the sequential circuit 135 of FIG. 2, for example, the flip flop circuit or the latch circuit. For example, the signal VS output through the detecting of the zero point (S230) is high and the signal VR output through the comparing of the reference waveform (S210) is low, a high signal is output from a Q output of the RS flip flop circuit 135 and generates as the PWM controls signal.

In the exemplary embodiment of the present invention, after the peak value of the feedback signal from the second side output is stored, the peak value is used at the time of generating the PWM control signal for the next period. Therefore, the line regulation characteristics can be more improved than the structure of controlling the PWM control signal by comparing the feedback signal from the photocoupler with the reference signal of the related art.

The exemplary embodiments of the present invention can store the peak value of one period of the feedback signal from the secondary side output and use the stored peak value for the PWM control of the next period.

The exemplary embodiment of the present invention can sense and store the peak of the feedback signal from, the secondary side output and use the peak to generate the PWM control signal, thereby improving the line regulation performance.

It is obvious that various effects directly stated according to various exemplary embodiment of the present invention may be derived by those skilled in the art from various configurations according to the exemplary embodiments of the present invention.

The accompanying drawings and the above-mentioned exemplary embodiments have been illustratively provided in order to assist in understanding of those skilled in the art to which the present invention pertains. In addition, the exemplary embodiments according to various combinations of the aforementioned configurations may be obviously implemented by those skilled in the art from the aforementioned detailed explanations. Therefore, various exemplary embodiments of the present invention may be implemented in modified forms without departing from an essential feature of the present invention. In addition, a scope of the present invention should be interpreted according to claims and includes various modifications, alterations, and equivalences made by those skilled in the art.

What is claimed is:

1. A PWM control circuit, comprising:
   a peak storing and reference signal generating unit storing a peak signal of one period of a feedback signal from a secondary side output and inverting the peak signal and outputting the inverted peak signal as a reference signal; and
   a PWM control signal generating unit generating a PWM control signal by using an output obtained by comparing the reference signal with a reference waveform.

2. The PWM control circuit according to claim 1, wherein the peak storing and reference signal generating unit includes: a peak detector detecting the peak signal of one period of the feedback signal from the secondary side output; a sample and hold circuit storing the peak signal detected by the peak detector for one period and outputting; and an inverter inverting the peak signal output from the sample and hold circuit and outputting the inverted peak signal as the reference signal.

3. The PWM control signal according to claim 1, wherein the PWM control signal generating unit includes:
   a PWM comparator comparing the reference signal output from the peak storing and reference signal generating unit with the reference waveform and outputting;
   a zero point detector detecting a point at which an input voltage is zero by using a signal sensed from the secondary side output; and
   a sequential circuit receiving an output of the PWM comparator and an output of the zero point detector as inputs and outputting the PWM control signal.

4. The PWM control circuit according to claim 3, wherein the zero point detector detects the point at which the input voltage is zero by comparing the signal sensed from the secondary side output with a predetermined low reference voltage signal.

5. The PWM control circuit according to claim 3, wherein the secondary side output provided to the zero point detector is an output from an auxiliary winding of the secondary side.

6. The PWM control circuit according to claim 1, wherein the peak storing and reference signal generating unit receives the feedback signal of the secondary side output from a photocoupler.

7. The PWM control circuit according to claim 1, wherein the PWM control circuit is an LED driving circuit.

8. The PWM control circuit according to claim 2, wherein the PWM control circuit is an LED driving circuit.

9. The PWM control circuit according to claim 3, wherein the PWM control circuit is an LED driving circuit.

10. A flyback converter, comprising:
  a transformer transforming and providing an input voltage of a primary side into an input voltage of a secondary side;
  the PWM control circuit according to claim 1; and
  a power transistor driven by the PWM control circuit and turning-on/off the input voltage of the primary side of the transformer.

11. The flyback converter according to claim 10, wherein the flyback converter is used for an LED lighting driving circuit.

12. A method for controlling PWM, comprising:
  storing a peak signal of one period of a feedback signal of a secondary side output, inverting the peak signal and outputting the inverted peak signal as a reference signal; and
  generating a PWM control signal by using an output obtained by comparing the reference signal with a reference waveform.

13. The method according to claim 12, wherein the storing, inverting and outputting includes: detecting the peak signal of one period of the feedback signal from the secondary side output; storing the detected peak signal for one period; and inverting the peak signal and outputting the inverted peak signal as the reference signal.

14. The method according to claim 12, wherein the generating of the PWM control signal includes:
  comparing the reference signal with the reference waveform;
  detecting a point at which an input voltage is zero by using a signal sensed from the secondary side output; and
  generating and outputting the PWM control signal by receiving an output from the comparing of the reference waveform and an output from the detecting of the zero point as inputs.

15. The method according to claim 14, wherein at the detecting of the zero point, the point at which the input voltage is zero by comparing the signal sensed from the secondary side output with a predetermined low reference voltage signal is sensed.

16. The method according to claim 14, wherein the secondary side output provided at the detecting of the zero point is an output from an auxiliary winding of the secondary side.

17. The method according to claim 12, wherein at the outputting of the reference signal, the peak signal of one period is stored by receiving the feedback signal of the secondary side output from a photocoupler.

18. The method according to claim 12, wherein the PWM control method is a method for controlling an LED driving circuit.

19. The method according to claim 13, wherein the PWM control method is a method for controlling an LED driving circuit.

20. The method according to claim 14, wherein the PWM control method is a method for controlling an LED driving circuit.

* * * * *